(12) United States Patent
Burd et al.

(10) Patent No.: US 7,954,325 B2
(45) Date of Patent: Jun. 7, 2011

(54) GAS TURBINE COMBUSTOR

(75) Inventors: Steven W. Burd, Cheshire, CT (US);
Albert K. Cheung, East Hampton, CT (US); Dae K. Dempsey, Greenwood, IN (US); James B. Hoke, Tolland, CT (US); Stephen K. Kramer, Cromwell, CT (US); John T. Ols, Coventry, CT (US); Reid Dyer Curtis Smith, Amston, CT (US); William A. Sowa, Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 1352 days.

(21) Appl. No.: 11/294,951

(22) Filed: Dec. 6, 2005

(65) Prior Publication Data

US 2007/0125093 A1 Jun. 7, 2007

(51) Int. Cl.
*F02C 1/00* (2006.01)

(52) U.S. Cl. ............................................. 60/752; 60/772

(58) Field of Classification Search ............ 60/752–760, 60/772
See application file for complete search history.

(56) References Cited

U.S. PATENT DOCUMENTS

| | | | |
|---|---|---|---|
| 2,268,464 A | | 12/1941 | Seippel |
| 3,937,007 A | * | 2/1976 | Kappler .......................... 60/777 |
| 4,030,875 A | * | 6/1977 | Grondahl et al. ................ 60/753 |
| 4,260,367 A | | 4/1981 | Markowski et al. |
| 4,265,615 A | | 5/1981 | Lohmann et al. |
| 4,420,929 A | | 12/1983 | Jorgensen et al. |
| 4,787,208 A | | 11/1988 | DeCorso |
| 4,984,429 A | | 1/1991 | Waslo et al. |
| 5,220,795 A | * | 6/1993 | Dodds et al. .................... 60/747 |
| 5,253,474 A | | 10/1993 | Correa et al. |
| 5,285,631 A | | 2/1994 | Bechtel, II et al. |
| 5,289,677 A | | 3/1994 | Jarrell |
| 5,435,139 A | | 7/1995 | Pidcock et al. |
| 5,592,819 A | | 1/1997 | Ansart et al. |
| 5,628,192 A | | 5/1997 | Hayes-Bradley et al. |
| 5,640,851 A | | 6/1997 | Toon et al. |

(Continued)

FOREIGN PATENT DOCUMENTS

DE 19631616 A1 2/1998

(Continued)

OTHER PUBLICATIONS

U.S. Appl. No. 10/684,355, filed Oct. 9, 2003, Burd.

(Continued)

*Primary Examiner* — Michael Cuff
*Assistant Examiner* — Gerald L Sung
(74) *Attorney, Agent, or Firm* — Marjama Muldoon Blasiak & Sullivan LLP (57) ABSTRACT

A gas turbine engine has a combustor module including an annular combustor having a liner assembly that defines an annular combustion chamber having a length, L. The liner assembly includes a radially inner liner, a radially outer liner that circumscribes the inner liner, and a bulkhead, having a height, H1, which extends between the respective forward ends of the inner liner and the outer liner. The combustor has an exit height, H3, at the respective aft ends of the inner liner and the outer liner interior. The annular combustor has a ratio H1/H3 having a value less than or equal to 1.7. The annular combustor may also have a ration L/H3 having a value less than or equal to 6.0.

13 Claims, 3 Drawing Sheets

U.S. PATENT DOCUMENTS

| | | | |
|---|---|---|---|
| 5,758,503 | A | 6/1998 | DuBell et al. |
| 5,782,294 | A | 7/1998 | Froemming et al. |
| 5,791,148 | A | 8/1998 | Burrus |
| 5,797,267 | A | 8/1998 | Richards |
| 5,983,642 | A | 11/1999 | Parker et al. |
| 6,047,539 | A | 4/2000 | Farmer |
| 6,105,360 | A | 8/2000 | Willis |
| 6,182,451 | B1 | 2/2001 | Hadder |
| 6,189,814 | B1 | 2/2001 | Richards |
| 6,240,731 | B1 | 6/2001 | Hoke et al. |
| 6,378,286 | B2 | 4/2002 | Vermes et al. |
| 6,470,685 | B2 | 10/2002 | Pidcock et al. |
| 6,571,566 | B1 | 6/2003 | Temple et al. |
| 6,606,861 | B2 | 8/2003 | Snyder |
| 6,701,714 | B2 | 3/2004 | Burd et al. |
| 6,763,664 | B2 | 7/2004 | Aoyama |
| 6,810,673 | B2 | 11/2004 | Snyder |
| 6,820,411 | B2 * | 11/2004 | Pederson et al. ............ 60/229 |
| 7,007,481 | B2 | 3/2006 | McMasters |
| 7,093,441 | B2 | 8/2006 | Burd et al. |
| 2002/0116929 | A1 | 8/2002 | Snyder |
| 2002/0148228 | A1 | 10/2002 | Kraft et al. |
| 2003/0061817 | A1 | 4/2003 | Aoyama |
| 2003/0101731 | A1 | 6/2003 | Burd et al. |
| 2003/0167771 | A1 | 9/2003 | Hayashi et al. |
| 2003/0213250 | A1 | 11/2003 | Pacheco-Tougas et al. |
| 2003/0233832 | A1 | 12/2003 | Martling et al. |
| 2004/0006995 | A1 | 1/2004 | Snyder |
| 2004/0226299 | A1 | 11/2004 | Drnevich |
| 2004/0231333 | A1 | 11/2004 | Tiemann |
| 2005/0022531 | A1 | 2/2005 | Burd |
| 2005/0086940 | A1 | 4/2005 | Coughlan, III et al. |
| 2005/0086944 | A1 | 4/2005 | Cowan |

FOREIGN PATENT DOCUMENTS

| | | |
|---|---|---|
| EP | 0544350 A1 | 6/1993 |
| EP | 1515090 A1 | 3/2005 |
| EP | 1522792 A1 | 4/2005 |
| EP | 1775516 A2 | 4/2007 |
| FR | 2694799 A1 | 2/1994 |
| GB | 818634 A | 8/1959 |
| GB | 2278431 A | 11/1994 |
| GB | 2384046 A | 7/2003 |
| GB | 2390890 A | 1/2004 |
| JP | 4139312 A | 5/1992 |

OTHER PUBLICATIONS

Extended European Search Report issued May 28, 2010 (7 pgs.).

* cited by examiner

FIG.2

GAS TURBINE COMBUSTOR

STATEMENT OF GOVERNMENT INTEREST

This invention was made with U.S. Government support under contract Nos. NAS3-01138 and NAS3-27727 awarded by NASA. The United States Government has certain rights in the invention.

CROSS-REFERENCE TO RELATED APPLICATIONS

This application is related to co-pending U.S. patent application Ser. No. 10/147,571, filed May 16, 2002, entitled "Heat Shield Panels For Use In A Combustor For A Gas Turbine Engine," published Nov. 20, 2003, as Patent Application Publication No. US2003/0213250A1, and subject to assignment to the common assignee of the present application, which application is incorporated herein by reference in its entirety. This application is also related to co-pending U.S. patent application Ser. No. 10/684,335, filed Oct. 9, 2003, entitled "Combustor", and subject to assignment to the common assignee of the present application, which application is incorporated herein by reference in its entirety.

FIELD OF THE INVENTION

This invention relates in general to gas turbine engines and, more particularly, to gas turbine engine combustors exhibiting lower emissions of oxides of nitrogen (NOx).

BACKGROUND OF THE INVENTION

Gas turbine engines, such as those used to power modern commercial aircraft, include a compressor for pressurizing a supply of air, a combustor for burning a hydrocarbon fuel in the presence of the pressurized air, and a turbine for extracting energy from the resultant combustion gases. In aircraft engine applications, the compressor, combustor and turbine are disposed about a central engine axis with the compressor disposed axially upstream of the combustor and the turbine disposed axially downstream of the combustor. An exemplary combustor features an annular combustion chamber defined between a radially inward liner and radially outward shell extending aft from a forward bulkhead. The radially inward liner forms a heat shield. The radially outward shell extends circumferentially about and is radially spaced from the inward liner. Arrays of circumferentially distributed combustion air holes penetrate the outward shell and the inward liner at multiple axial locations to admit combustion air into the combustion chamber along the length of the combustion chamber. A plurality of circumferentially distributed fuel injectors and associated swirlers or air passages are mounted in the forward bulkhead. The fuel injectors project into the forward end of the combustion chamber to supply the fuel. The swirlers impart a swirl to inlet air entering the forward end of the combustion chamber at the bulkhead to provide rapid mixing of the fuel and inlet air. Commonly assigned U.S. Pat. Nos. 6,606,861 and 6,810,673, the entire disclosures of which are hereby incorporated herein by reference as if set forth herein, disclose exemplary prior art annular combustors for gas turbine engines.

Combustion of the hydrocarbon fuel in air inevitably produces oxides of nitrogen (NOx). NOx emissions are the subject of increasingly stringent controls by regulatory authorities. Accordingly, engine manufacturers strive to minimize NOx emissions.

One combustion strategy for minimizing NOx emissions from gas turbine engines is referred to as rich burn, quick quench, lean burn (RQL) combustion. The RQL combustion strategy recognizes that the conditions for NOx formation are most favorable at elevated combustion flame temperatures, i.e. when the fuel-air ratio is at or near stoichiometric. A combustor configured for RQL combustion includes three serially arranged combustion zones: a fuel-rich combustion zone at the forward end of the combustor, a quench or dilution zone that involves the conversion of rich combustion to lean combustion, and a lean combustion zone axially aft of the quench or dilution zone. Thus, the combustion process in a combustor configured for RQL combustion has two governing states of combustion: a first state in the forward portion of the combustor that is stoichiometrically fuel-rich and that is rapidly converted in a downstream second state that is stoichiometrically fuel-lean.

During engine operation with RQL combustion, a portion of the pressurized air discharged from the compressor is directed through a diffuser to enter the combustion chamber through the inlet air swirlers to support rich-burn combustion. Concurrently, the fuel injectors introduce a stoichiometrically excessive quantity of fuel into the front portion of the combustor. The resulting stoichiometrically rich fuel-air mixture is ignited and burned to partially release the energy content of the fuel. The fuel rich character of the mixture inhibits NOx formation in the rich burn zone by suppressing the combustion flame temperature. It also resists blowout of the combustion flame during certain operating conditions or any abrupt transients to engine power and promotes good ignition of the combustor.

The fuel rich combustion products generated in the first zone of combustion propagate where the combustion process continues. Pressurized air from the compressor enters the combustion chamber radially through combustion air holes. The air mixes with the combustion products from the first zone to support further combustion and release additional energy from the fuel. The air also progressively deriches the fuel rich combustion products as they flow axially through and mix with the air introduced in the quench region. Initially, with the air addition, the fuel-air ratio of the combustion products becomes less fuel rich approaching a stoichiometric composition, causing an attendant rise in the combustion flame temperature. Since the quantity of NOx produced in a given time interval increases exponentially with flame temperature, significant quantities of NOx can be produced during the initial quench process where the combustion is rich. As quenching continues, the fuel-air ratio of the combustion products rapidly convert through the stoichiometric state to become fuel lean, causing an attendant reduction in the flame temperature. However, until the mixture is diluted to a fuel-air ratio substantially lower than stoichiometric, the flame temperature remains high enough to generate appreciable quantities of NOx.

Finally, the deriched combustion products after quench flow axially into the downstream of the combustor where the combustion process concludes as lean-burn combustion. Additional jets of compressor discharge air may be admitted radially into the lean burn zone. The additional air supports ongoing combustion to complete combustion of the fuel and to reduce the peak temperature, as well as regulate the spatial temperature profile of the combustion products prior to entering the turbine. Regulation of the peak temperature and temperature profile protects the turbine from exposure to excessive temperatures and excessive temperature gradients.

Another combustion strategy for minimizing NOx emissions from gas turbine engines is referred to as lean direct injection (LDI) combustion. The LDI combustion strategy also recognizes that the conditions for NOx formation are most favorable at elevated combustion flame temperatures, i.e. when the fuel-air ratio is at or near stoichiometric. In LDI combustion, more than the stoichiometric amount of air required for combustion of the fuel is injected into the forward region of the combustion chamber and rapidly mixed with the inlet air to combust via a fuel-lean, as opposed to fuel-rich, process. A combustor configured for LDI combustion includes two serially arranged combustion zones: an overall fuel-lean combustion zone at the forward end of the combustor in which fuel and air are initially mixed followed by additional lean-burn combustion supported by dilution or cooling air addition in the axially aft portion of the combustor. The combustion process in a combustor configured for LDI combustion, by design intent, exists in one bulk governing state in which combustion is exclusively and stoichiometrically lean. Clearly, local conditions may not be lean given that mixing of the fuel and air require some finite time and spatial volume via mixing to achieve this state.

During engine operation with LDI combustion, a greater majority of the pressurized air discharged from the compressor is directed to the front end of the combustor through the inlet air swirlers, passages or a mixing chamber. The amount of air introduced as inlet air into the combustor is stoichiometrically excessive relative to the fuel injected concurrently through the front end. The resulting stoichiometrically fuel-lean fuel-air mixture is ignited and substantially combusted in the fore portion of the combustion chamber. The substantial excess of air in this zone inhibits NOx formation by suppressing the combustion flame temperature. The combustion products from this zone flow downstream with further mixing, potentially into a dilution zone, generally axially aft of the initial fuel lean burn zone. In the case of dilution, additional compressor discharge air is admitted radially into the combustor. The additional air contributes further to the combustion process and dilutes the combustion products thereby reducing the peak temperature, as well as regulating the spatial temperature profile of the combustion products prior to entering the turbine. Regulation of the peak temperature and temperature profile protects the turbine from exposure to excessive temperatures and excessive temperature gradients. Cooling air introduction into this second step can be supplemental to or in lieu of the dilution.

Most of the NOx emissions generated during combustion of a fuel in pressurized air in a gas turbine engine, whether by RQL combustion or LDI combustion, originates in high-temperature zones of localized, near-stoichiometric combustion conditions. These conditions occur despite the overall fuel lean nature of a LDI combustion chamber or the fuel-rich nature of the forward portion of a RQL combustion chamber. Thus, it is important to limit the time available for NOx formation. However, if combustion residence time, conventionally calculated by dividing the volume of the combustion chamber by the volumetric flow of gases through the combustion chamber, is to short or managed improperly, combustion of the fuel will be incomplete resulting in loss of power or performance trades, continued combustion in the turbine resulting in hot spots that occur in and damage the turbine, and possible increases in emissions, including carbon monoxide and hydrocarbons associated with combustion inefficiencies or complex physics.

SUMMARY OF THE INVENTION

This invention embodies configurations, methods and engine designs in which combustor residence time is reduced effectively, reliably and properly through the management of the height (or span) between inner and outer walls of the combustor and the air flow distributions throughout the combustor volume from fore to aft to provide a low NOx emission combustor.

It is an object of an aspect of the invention to provide a low NOx emission combustor for a gas turbine engine.

It is an object of an aspect of the invention to provide a method of designing a low NOx emission combustor for a gas turbine engine.

It is an object of an aspect of the invention to provide a method for controlling NOx production in the combustor of a gas turbine engine.

It is an object of an aspect of the invention to provide a gas turbine engine characterized by a low NOx emission combustor.

A combustor for a gas turbine engine has a first circumferentially extending liner having an axis, a second circumferentially extending liner spaced radially outboard of and coaxially circumscribing the first liner, and a bulkhead extending between a forward end of the first liner and a forward end of the second liner and cooperating therewith to define a combustion chamber for combusting fuel in air. The annular combustor has an overall length, L, as given by the distance from the inside surface of the bulkhead and extending aft along to the combustor exit along its axis. The annular combustor has a bulkhead height, $H1$, that extends predominantly in the radial direction relative to the engine centerline or normal to the combustor axis between the forward portions of the inner and outer liners, and an exit height, $H3$, that extends predominantly in the relative direction relative to the engine centerline or normal to the combustor axis between the aft portions of the inner and outer liners.

In one aspect of the invention, the annular combustor has a ratio, $H1/H3$, that is the ratio of the combustion chamber bulkhead height to the combustor exit height, having a value less than 1.7. In one embodiment, the annular combustor has a ratio, $H1/H3$, having a value in the range from 0.8 to 1.7. In another embodiment, the annular combustor has a ratio, $H1/H3$, having a value in the range from 1.2 to 1.6. In a further aspect of the invention, the annular combustor has a normalized combustor length, $L/H3$, that is the ratio of the combustor length to the combustor exit height, having a value less than or equal to 6.0.

According to a further aspect of the invention, a method is provided for designing a low NOx emission combustor for a gas turbine engine having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define a combustion chamber for combusting fuel in air. The method comprises sizing the annular combustor such that the ratio, $H1/H3$, that is the ratio of the combustion chamber bulkhead height to the combustor exit height, having a value less than 1.7. In one embodiment of the method, the annular combustor is sized such that the ratio, $H1/H3$, has a value in the range from 0.8 to 1.7. In another embodiment of the method, the annular combustor is sized such that the, $H1/H3$, has a value in the range from 1.2 to 1.6. In a further aspect of this method, the annular combustor is sized to have a normalized combustor length, $L/H3$, that is the ratio of the combustor length to the combustor exit height, having a value less than or equal to 6.0.

In a further aspect of the invention, a method of controlling NOx formation in a gas turbine engine comprises providing an annular combustor having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define combustion chamber for combusting fuel in air, wherein the annular combustor has a ratio, H1/H3, that is the ratio of the combustion chamber bulkhead height to the combustor exit height, having a value in the range from 0.8 to 1.7, and operating the annular combustor in a rich-quench-lean combustion mode whereby a fuel rich burn zone is provided in a forward region of the combustion chamber, and a dilution zone is provided downstream of the fuel rich burn zone. The method includes steps of admitting fuel to be combusted to the fuel rich burn zone only, and admitting air to the combustion chamber, with about 10% to about 30% of the admitted air being admitted directly into the fuel rich burn zone, with about 40% to about 80% of the admitted air being admitted directly into the dilution zone, and with about 5% to about 35% of the admitted air being admitted as air for cooling the inner and outer liners. In one embodiment of the method, the step of admitting air to the combustion chamber comprises admitting 12% to 18% of the admitted air directly into the fuel rich burn zone, admitting 50% to 70% of the admitted air directly into the dilution zone, and admitting 12% to 18% of the admitted air as air for cooling the inner and outer liners.

In another aspect of the invention, a method of controlling NOx formation in a gas turbine engine comprises providing an annular combustor having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define a combustion chamber for combusting fuel in air, wherein the annular combustor has a ratio, H1/H3, that is the ratio of the combustion chamber bulkhead height to the combustor exit height, having a value in the range from 0.8 to 1.7, and operating the annular combustor in a lean direct injection combustion mode whereby an initial fuel lean burn zone is provided in a forward region of the combustion chamber, and a mixing or dilution zone is provided downstream of the initial fuel lean burn zone. The method includes the steps of admitting fuel to be combusted to the fuel rich burn zone only, and admitting air to the combustion chamber, with about 50% to about 90% of the admitted air being admitted directly into the fuel lean burn zone, with about 0% to about 20% of the admitted air being admitted directly into the mixing or dilution zone, and with about 0% to about 25% of the admitted air being admitted as air for cooling the inner and outer liners. In one embodiment of the method, the step of admitting air to the combustion chamber comprises admitting 60% to 80% of the admitted air directly into the fuel lean burn zone, admitting 0% to 10% of the admitted air directly into the dilution zone, and admitting 5% to 15% of the admitted air as air for cooling the inner and outer liners.

In a still further aspect of the invention, a gas turbine engine having a combustor, a compressor, and a turbine coaxially disposed about a central longitudinal axis, is characterized by low NOx emission combustor comprising a first circumferentially extending liner having an axis disposed coaxially with the longitudinal axis of the engine, a second circumferentially extending liner spaced radially outboard of and circumscribing the first liner, and a bulkhead extending between a forward end of the first liner and a forward end of the second liner and cooperating therewith to define a combustion chamber for combusting fuel in air. The annular combustor has a ratio, H1/H3, that is the ratio of the combustion chamber bulkhead height to the combustor exit height, having a value less than 1.7. In one embodiment, the annular combustor has a ratio, H1/H3, having a value in the range from 0.8 to 1.7. In another embodiment, the annular combustor has a ratio, H1/H3, having a value in the range from 1.2 to 1.6. In a further aspect of the invention, the annular combustor may have a normalized combustor length, L/H3, that is the ratio of the combustor length to the combustor exit height, having a value less than or equal to 6.0.

BRIEF DESCRIPTION OF THE DRAWINGS

For a further understanding of these and objects of the invention, reference will be made to the following detailed description of the invention which is to be read in connection with the accompanying drawing, where.

DETAILED DESCRIPTION OF THE INVENTION

Figure 1:
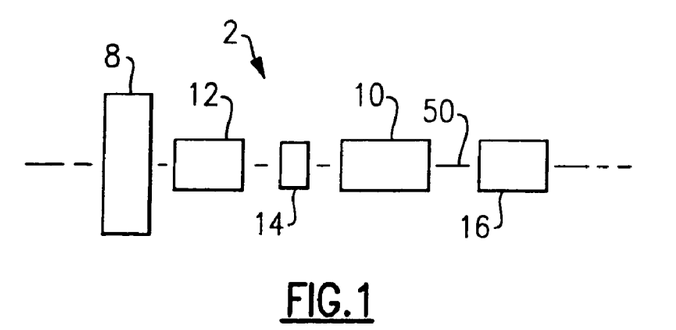
FIG. 1 is a schematic representation of a gas turbine engine.

Referring to FIG. 1, there is depicted schematically a conventional gas turbine engine 2 includes a combustor module 10, a compressor 12 disposed forward, that is upstream with respect to flow, of the combustor module 10, a diffuser 14 extending from the outlet of the compressor to the forward end of the combustor module 10, and a turbine module 16 disposed aft, that is downstream with respect to flow, of the combustor module 10. The compressor, combustion module 12 and turbine module 16 are generally coaxially disposed about a central longitudinal axis 50 of the engine shaft which constitutes the centerline of the gas turbine engine. For a turbofan gas turbine engine, a large diameter fan 8 is mounted to the engine shaft forward of the compressor 12. Most large commercial jet liners of contemporary design use the turbofan version of the gas turbine engine to power the aircraft. It should be noted that small engines may have radial or centrifugal compressors, rather than axial compressors.

Figure 2:
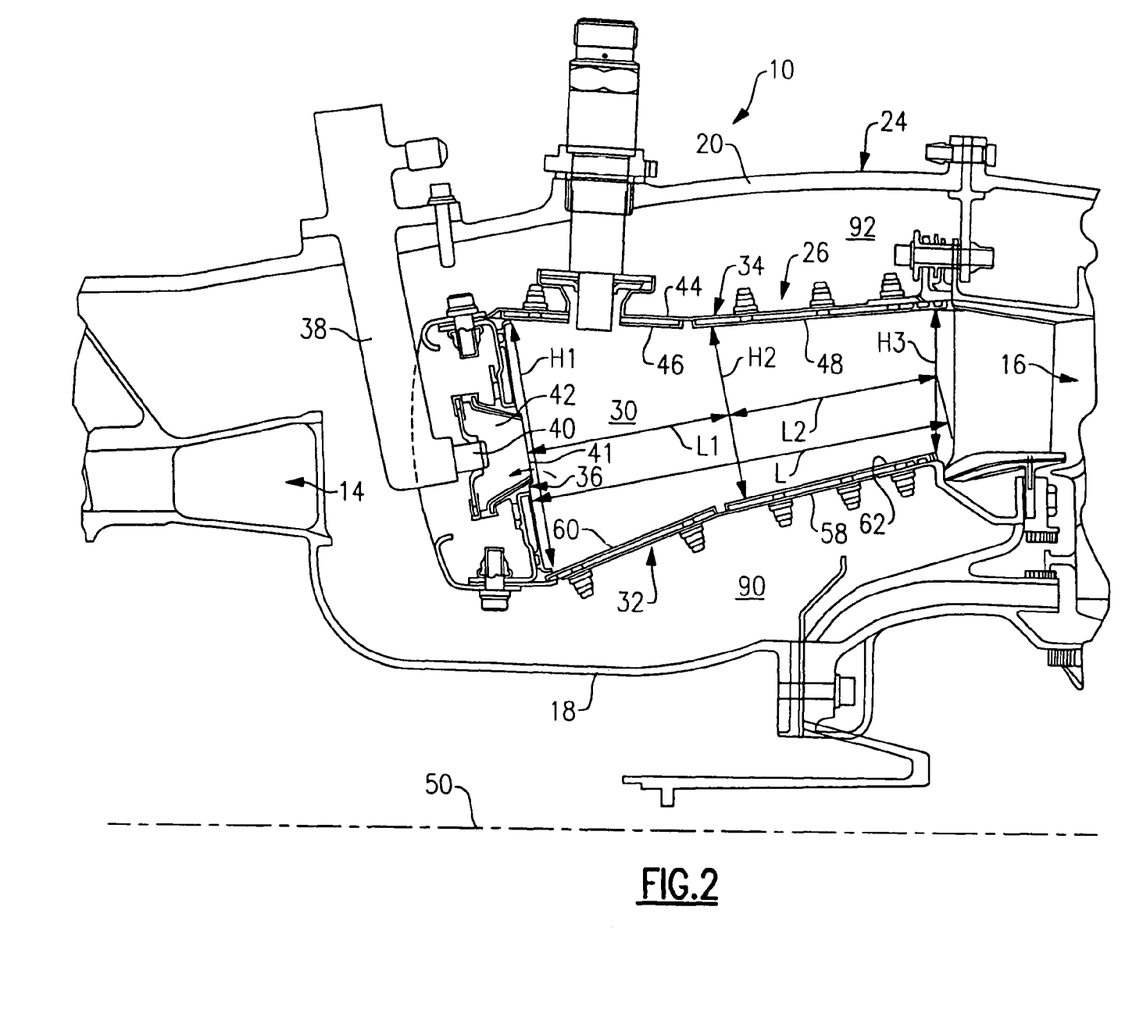
FIG. 2 is a cross-sectional side elevation view of an annular combustor according to the present invention.
Figure 3:
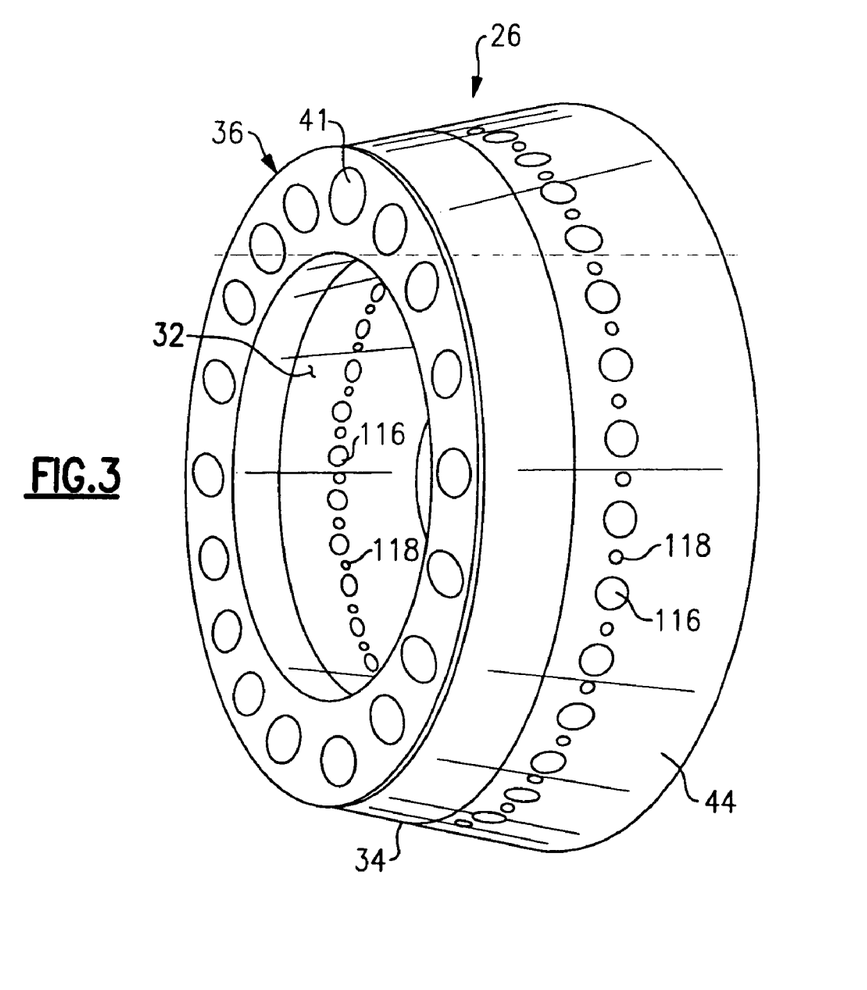
FIG. 3 is a perspective view showing an annular combustor according to the invention.

Referring now to FIG. 2, the exemplary combustor module 10 comprises a radially inner case 18 and a radially outer case 20, concentric with the inner case, which in cooperation define an annular pressure vessel 24 concentric with the engine axis 50. A combustor 26 is disposed within the annular pressure vessel 24. The liner assembly includes a radially inner liner 32, a radially outer liner 34 that circumscribes the inner liner 32, and a bulkhead 36 which extending between the respective forward ends of the inner liner 32 and the outer liner 34. Collectively, the inner liner 32, the outer liner 34 and the forward bulkhead 36 bound the annular combustion chamber 30. The combustor 26 may have a forward portion wherein the inner and outer liners converge from fore to aft and an aft portion wherein the inner and outer liner converge fore to aft more gradually than the first portion. A detailed description of a combustor of this configuration is presented in the aforementioned U.S. patent application Ser. No. 10/684,335, as well as in the aforementioned U.S. Pat. Nos. 6,606,861 and 6,810,673. However, the depicted combustor configuration is exemplary and not limiting of the invention.

For example, the combustor 26 may have a forward portion wherein the inner and outer liners extend aft in parallel relationship an aft portion wherein the inner and outer liner converge fore to aft more gradually than the first portion. A detailed description of a combustor of this configuration is presented in the aforementioned U.S. patent application Ser. No. 10/440,585. In other configurations, the inner and outer liners may be parallel over the entire length of the liner assembly, or the liners may converge in a forward portion and then extend parallel in an aft portion, or the liners may converge in both the forward and aft portions at the same or different angles of convergence throughout, or the liners may assume geometrically differing in cross-section.

The forward bulkhead 36 carries a plurality of fuel nozzles 40, for example typically from 12 to 24 depending upon the size of the engine, disposed in a circumferential array at spaced intervals about the annular combustion chamber 30. Each fuel nozzle 40 is disposed at the end of a fuel injector 38 which extends through the outer case 20 to convey fuel from an external source to the associated fuel nozzle. Each fuel nozzle 40 injects fuel through a spray head into a central stream of air emitted along the centerline of the fuel nozzle. An air passage 41, which may have a swirler 42 associated therewith as depicted in the exemplary embodiment, is operatively associated with each fuel nozzle 40. Pressurized air from the compressor is directed into the diffuser 14 into the annular plenums 90, 92 defined within the annular pressure vessel 24. A portion of this pressured air passes into the combustion chamber 30 through the air passages 41. Each swirler 42 imparts a spin to the air passing therethrough to provide rapid mixing of this air with the fuel being injected through the associated fuel nozzle 40.

In the exemplary embodiment, the inner liner 32 and the outer liner 34 are structured with a support shell and associated heat shields. The outer liner 34 comprises a single piece outer support shell 44 connected to the outer case 20, and forward and aft outer heat shields 46, 48 secured by fasteners (not shown) to respective forward and aft portions of the outer shell. Similarly, the inner liner 32 comprises a single piece inner support shell 58 connected to the inner case 18, and forward and aft inner heat shields 60, 62 secured by fasteners (not shown) to respective forward and aft portions of the inner shell. The heat shields may be formed as a circumferential array of actuate panels. Exemplary liner and heat shield constructions are described and shown in the aforementioned U.S. patent application Ser. No. 10/147,571, and in U.S. Pat. Nos. 5,435,139 and 5,758,503. Other embodiments, including single-wall liners, are still within the spirit and scope of the invention.

In the exemplary embodiment depicted in FIGS. 2, 3, 4 and 5, the inner and outer liners 32, 34 each have a row of circumferentially distributed combustion air admission holes penetrating through at the forward end of the aft section thereof. The row of combustion air holes in each of the inner and outer liners 32, 34 includes at least a set of larger diameter holes 116 distributed at equal arc distances, and may also include a set of smaller diameter holes 118 disposed circumferentially distributed among larger diameter holes 116. Each of the holes 116 in the respective support shell of each of the liners 32, 34 has a corresponding hole 116 in the associated aft heat shield. Similarly, each of the holes 118 in the respective support shells of each of the liners 32, 34 has a corresponding hole 118 in the associated aft heat shield. A plurality of axially and circumferentially distributed cooling air holes 70, 72 also perforates the inner liner 32 and the outer liner 34. These cooling air holes, depicted only in FIGS. 4 and 5, include a plurality of impingement cooling holes 70 penetrating transversely through the support shells and a plurality of film cooling holes 72 penetrating obliquely through the heat shields. The cooling air holes 70, 72 are readily distinguishable from combustion air holes 116, 118 because the cooling air holes are far more numerous and substantially smaller than the combustion air holes. During engine operation, pressurized cooling air from plenums 90, 92 enters the impingement cooling holes 70. The cooling air exits the holes 70 as a first series of discrete jets that impinge on and cool the heat shields. The impinged cooling air then flows through the film cooling holes 72, which discharge a second series of cooling air jets into the combustion chamber. Because the film cooling holes 72 are obliquely oriented, the second cooling air jets enter the combustion chamber with a directional component about the flame exposed surface of each heat shield. The jet direction and the hole packaging helps the cooling air jets coalesce into a cooling film that hugs the flame exposed surfaces of the heat shields. Exemplary sizing and arrangements of combustor air holes and cooling air holes are shown in the aforementioned U.S. Pat. Nos. 6,606,861 and 6,810,673. Other combustor hole embodiments may be used within the spirit and scope of the invention.

In operation, the diffuser 14 decelerates pressurized air flowing from the compressor, not shown, and directs that air into the annular volume 90 defined within the annular pressure vessel 24. A portion of this pressurized air enters the forward region of the combustion chamber 30 potentially through the fuel nozzles 40 and by way of the air passages 41 associated the fuel nozzles 40. Additional air enters the forward region of the combustion chamber 30 by way of cooling holes (not shown) in the forward bulkhead 36 as bulkhead cooling air. Collectively, these portions of air admitted at the forward end of the combustion chamber are referred to as primary combustion air contributors because it intermixes to a great extent with fuel introduced through the fuel nozzles 40 to support initial combustion in the forward section of the combustion chamber. A second portion of the pressurized air enters the combustion chamber 30 from the annular plenums 90, 92 by way of the impingement and film cooling holes 70, 72 to cool the liner heat shields 46, 48, 60, 62. This second portion of pressurized air flows aft along the inner surface of the liner assembly and gradually mixes into the combustion products in the aft section of the combustion chamber, rather than directly penetrating into the combustion products upstream where injected. This portion of the air admitted to the combustion chamber is generally referred to as liner cooling air. A third portion of pressurized air from the annular plenums 90, 92 enters the combustion chamber 30 as dilution air for the purpose of contributing to the combustion process, diluting the combustion products and eliminating hot spots within the combustion products to provide a desired spatial temperature profile across the combustion products before entering the turbine module 16.

In the exemplary embodiment depicted in the drawing, the combustor 26 is designed to operate via a RQL combustion process. In this embodiment, the dilution air enters the combustion chamber 90 through the aforementioned air holes 116, 118 located circumferentially about the aft portion of the forward section of the combustor 26. In RQL combustion, the portion air admitted to the combustion chamber as primary is limited to an amount significantly less than the amount of air required for stoichiometric combustion of the fuel injected through the fuel nozzles 40. Thus, combustion in the forward section of the combustion chamber occurs, on average, under fuel rich conditions, although local variability in terms of stoichiometric combustion is likely. The overall fuel-rich stoichiometry of the fuel-air mixture in this rich burn zone RB produces a relatively cool flame, thus reducing excessive NOx formation and guarding against blowout of the combustion flame during any abrupt reduction in engine power or low-power operation.

The combustion products from this rich burn zone, which include unburned fuel, then enter a quench zone Q wherein the dilution air portion of the pressurized air from the compressor flows from plenum 90 through the aforementioned combustion air holes 116, 118 to penetrate radially inwardly in the combustion products. This dilution air dilutes and deriches the combustion products from their stoichiometrically rich state proximate to the forward edge of the quench zone to a stoichiometrically fuel lean state proximate to the aft edge of the quench zone. It is also important for the dilution air to intermix intimately with the combustion products flowing through the combustion chamber so that the fuel-air mixture quickly becomes both thoroughly blended and regularly distributed. As used herein, the term "regularly" refers to a state in which the fuel-air ratio is substantially uniform in the circumferential direction (at any arbitrarily specified radius) and in which the radial distribution of fuel-air ratio is either substantially uniform or varies in a desired, pre-established way.

The axial location of the rows of air holes 116, 118 is selected to harmonize the competing considerations of optimizing the spatial temperature profile of the combustion products and preventing excessive NOx formation in the primary combustion zone upstream of the holes 116, 118. The hole rows are positioned far enough forward to ensure that the air jets exiting therefrom have enough axial distance and ample time to adjust the temperature profile of the combustion products and achieve desired combustion efficiency before those gases enter the turbine module 16. The hole rows are also positioned far enough aft to prevent the dilution air from being entrained into the fuel-air mixture immediately aft of the fuel nozzles 40. Such entrainment would increase NOx emissions and degrade combustor blowout resistance by deriching the fuel-air mixture in the fuel rich burn zone. The circumferential distribution and axial alignment of the rows of dilution air holes 116, 118 not only mitigates NOx formation as described above, but also contributes to the peak temperature and spatial temperature profile of the exhaust gases entering the turbine module 16. In the aft section of the liner assembly, which bounds the downstream portion of the combustion chamber 30, the fuel-air mixture is fuel lean and diluted to the design point overall fuel-air ratio as the liner cooling air admitted through holes 70, 72 gradually mixes with and further dilutes the combustion products prior to the combustion products entering the turbine module 16. A more detailed description of RQL combustion in an exemplary RQL combustor is presented in the aforementioned U.S. Pat. Nos. 6,606,861 and 6,810,673.

As will be appreciated by those skilled in the art, with appropriate modification in the sizing and perhaps the arrangement of the dilution air holes 116, 118, the combustor could be operated in a lean direct injection combustion mode. In LDI combustion, the portion air admitted to the combustion chamber as primary is increased to an amount significantly greater than the amount of air required for stoichiometric combustion of the fuel injected through the fuel nozzles 40. Thus, combustion in the forward section of the combustion chamber occurs, on a spatial average, under fuel lean conditions, although local pockets of stoichiometric variability and combustion are likely. The overall fuel-lean stoichiometry of the fuel-air mixture in such a lean burn zone produces a relatively cool flame, thus reducing excessive NOx formation. As the combustion products from this fuel lean burn zone pass downstream into the aft section of the liner assembly, the combustion products may be further mixed out and/or diluted by dilution air passing through the holes 116, 118 from plenum 90 to penetrate radially inwardly in the combustion products.

The axial location of the rows of air holes 116, 118 is selected to harmonize the competing considerations of optimizing the spatial temperature profile of the combustion products and preventing excessive NOx formation in the primary combustion zone upstream of the holes 116, 118. The hole rows are positioned far enough forward to ensure that the air jets exiting therefrom have enough axial distance and ample time to adjust the temperature profile of the combustion products before those gases enter the turbine module 16. The hole rows are also positioned far enough aft to allow mixing of flow and air about the fuel nozzles 40 to occur per design intent. Such entrainment could jeopardize combustion stability and result in flame out if the fuel-air mixture became too fuel lean in the burn zone. As in an RQL combustor, the circumferential distribution and axial alignment of the rows of dilution air holes 116, 118 again adjusts the peak temperature and spatial temperature profile of the exhaust gases entering the turbine module 16. In the aft section of the liner assembly, which bounds the downstream portion of the combustion chamber 30, the fuel-air mixture is fuel lean and diluted to the design point overall fuel-air ratio as the liner cooling air admitted through holes 70, 72 gradually mixes with and further dilutes the combustion products prior to the combustion products entering the turbine module 16.

Oxides of nitrogen are produced during the combustion of fuel in pressurized air in gas turbine combustors through chemical reactions that occur primarily in the high-temperature combustion region. The chemical kinetics of those reactions are a function of the local composition of the reactants, pressure, temperature and the amount of time available for the reactions to progress. In a gas turbine combustor, reaction time is proportional to residence time of the combustion gases within the combustion chamber. Residence time within a gas turbine combustor is conventionally calculated by dividing the overall combustion chamber geometric volume by the volumetric flow rate of combustion products passing through the combustion chamber. The volumetric flow rate of air through the combustor is determined by and is a function of engine configuration, engine pressure ratio, compressor efficiencies, pressure drop through the combustor, the spatial distribution of pressures within the diffuser and the combustor, and other factors. In general, the volumetric flow rate increases with engine size.

A known strategy for controlling NOx formation is to reduce peak combustion temperatures and to minimize residence time of the reaction gases at peak temperatures. However, if temperatures are reduced too much and/or residence time is reduced too much, incomplete combustion may occur resulting in undesirable performance and increased emissions of carbon monoxide or burned hydrocarbons or undesired stoichiometry at the exit to the combustor. Applicants have found that residence time within annular combustors can be controlled to reside within a range of acceptable valves for low NOx emission by designing the combustor to have a volume as specified by normalized geometric dimensions within a definable range of values. This invention embodies configurations, methods and engine designs in which combustor residence time is reduced effectively, reliably and properly through the management of the height (or span) between inner and outer walls of the combustor and the air flow distributions throughout the combustor volume from fore to aft.

The annular combustor has an overall length, L, as given by the distance from the inside surface of the bulkhead and extending aft along to the combustor exit along its axis. The annular combustor has a bulkhead height, H1, that extends predominantly in the relative direction relative to the engine centerline or normal to the combustor axis between the forward portions of the inner and outer liners. The annular combustor has an exit height, H3, that extends predominantly in the relative direction relative to the engine centerline or normal to the combustor axis between the aft portions of the inner and outer liners. In a rich-quench-lean combustion mode, the portion of the combustor wherein an overall fuel-rich burn state is provided is the forward region of the combustion chamber that extends from the bulkhead a distance, L1, to the center of the row or rows of orifices that supply the dilution air, whereat the height of the combustor is H2, and the portion of the combustion chamber wherein conversion to and combustion in an overall fuel lean state is provided extends the remaining length, L2, of the combustor downstream of L1. Thereby, the sum of the dimensions L1 and L2 is equivalent to L. In a lean-direction-injection combustion mode, combustor is only in an overall lean-rich burn state governed geometrically by the bulkhead height, H1, the combustor exit height, H3, the intermediate shape or profile, and the overall combustor length, L.

In one aspect of the invention, the annular combustor is designed to have a ratio of the combustor bulkhead height to the combustor exit height, that is H1/H3, with a value less than or equal to 1.7. In one embodiment, the annular combustor has a ratio, H1/H3, having a value in the range from 0.8 to 1.7. In another embodiment, the annular combustor has a ratio, H1/H3, having a value in the range from 1.2 to 1.6. In a further aspect of the invention, the annular combustor has a normalized combustor length, that is the ratio of the combustor length to the combustor exit height, L/H3, having a value less than or equal to 6.0. Annular combustion chambers characterized by a normalized height ratio, H1/H3, within the specified range of from 0.8 to 1.7 and a normalized combustor length less than or equal to 6.0, will generally be characterized by residence times falling between 1.5 milliseconds to 3.0 milliseconds. Annular combustion chambers characterized by a normalized height ratio, H1/H3, within the specified range of from 1.2 to 1.6 and a normalized combustor length less than or equal to 6.0, will generally be characterized by residence times falling between 2.0 milliseconds to 2.7 milliseconds.

In accordance with another aspect of the present invention, the various flows of air admitted to the combustion chamber 30 designed in accord with the invention, that is the primary air flow, the dilution air flow and the cooling air flow, are each controlled so as to uniquely and distinctly distribute the combustion air in manner so as to reduce peak combustion temperatures to thereby reduce NOx formation. In a combustor wherein fuel is combusted in accordance with the RQL combustion strategy, the total air flow entering the combustor should be distributed as follows: in the range of from 10% to 30% as primary air flow, in the range of from 40% to 80% as dilution air flow, and in the range of from 5 to 35% of liner cooling air flow. In one distribution for RQL combustion, the total air flow entering the combustor is distributed as follows: in the range of from 12 to 18% as primary air flow, in the range of from 50% to 70% as dilution air flow, and in the range of from 12% to 18% as liner cooling air flow.

In a combustor wherein fuel is combusted in accordance with the LDI combustion strategy, the total air flow entering the combustor should be distributed as follows: in the range of from 50% to 90% as primary air flow, in the range of from 0% to 20% as dilution air flow, and in the range of from 0 to 25% of liner cooling air flow. In one distribution for LDI combustion, the total air flow entering the combustor is distributed as follows: in the range of from 60 to 80% as primary air flow, in the range of from 0% to 10% as dilution air flow, and in the range of from 5% to 15% as liner cooling air flow.

Figure 4:
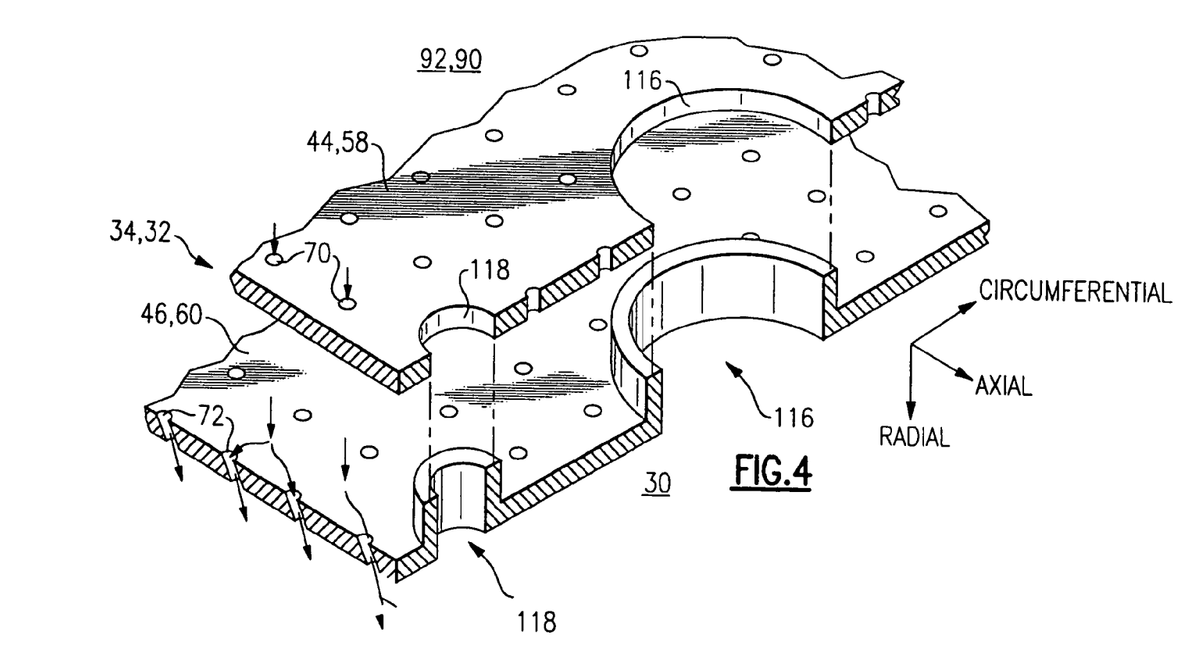
FIG. 4 is an exploded, enlarged perspective view of a portion of the combustor shown in FIG. 2.
Figure 5:
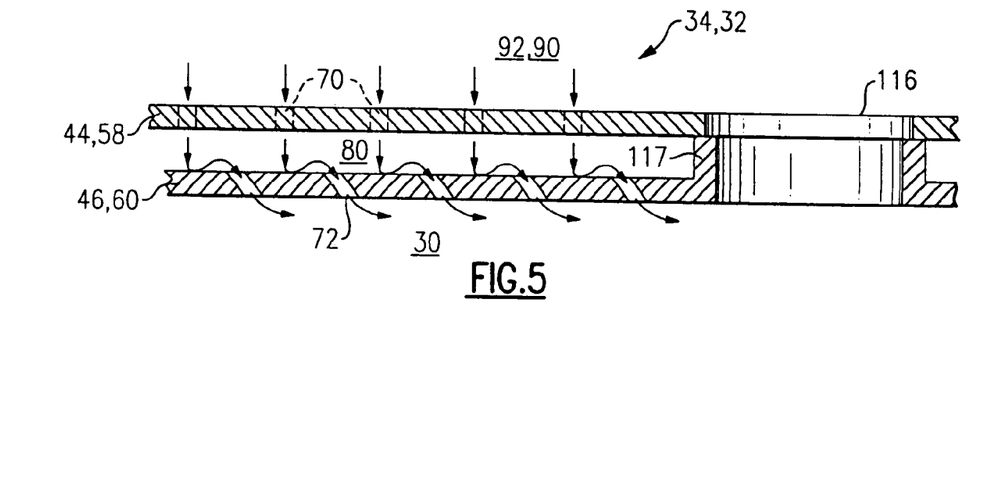
FIG. 5 is a side elevation view of a portion of the combustor shown in FIG. 4.

In the exemplary embodiment depicted in the drawing, the inner liner 32 and the outer liner 34 forming the liner assembly of the annular combustor 26 are of dual-wall construction. Referring to FIGS. 4 and 5, as noted previously, each of the inner liner 32 and the outer liner 34 have a support shell that supports a forward and an aft heat shield formed as a circumferential array of actuate heat shield panels. Each heat shield panel has a surface that faces the hot combustion products within the combustion chamber 30. The cooling of the heat shield panels is accomplished by passing the liner cooling air flow through the holes 72 in the heat shield panels. This liner cooling air first passes from the annular plenums 90, 92 through the holes 70 in the respective support shell, thereby cooling the support shells, into a gap 80 between the outer support shell and inner heat shield and thence through the holes 72. The aforementioned relatively low levels of liner cooling air flow are possible in part due to the dual-wall construction of the liners, which reduces the cooling flux required to cool the support shell, and by higher heat transfer efficiency.

While the present invention has been particularly shown and described with reference to the depicted embodiment as illustrated in the drawing, it will be understood by one skilled in the art that various changes in detail may be effected therein without departing from the spirit and scope of the invention as defined by the claims.

We claim:

1. An annular combustor for a gas turbine engine, comprising:
    a first circumferentially extending liner having a longitudinal axis;
    a second circumferentially extending liner spaced radially outboard of and coaxially circumscribing the first liner; and
    a bulkhead extending between a forward end of the first liner and a forward end of the second liner and cooperating therewith to define a single annular combustion chamber for combusting fuel in air, the bulkhead having a height, H1, and the combustion chamber having an exit height, H3, and a length, L;
    said annular combustor characterized in that the ratio of the bulkhead height to the combustor exit height, H1/H3, has a value in the range from 1.2 to 1.6.

2. An annular combustor for a gas turbine engine as recited in claim 1 further characterized in that the ratio of combustor length to the combustor exit height, L/H3, has a value less than or equal to 6.0.

3. A method of designing an annular combustor for a gas turbine engine, the combustor having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define a single annular combustion chamber for combusting fuel in air, the bulkhead having a height, H1, and the combustion chamber having an exit height, H3, and a length, L; the method comprising the step of sizing the annular combustor such that the ratio of the bulkhead height to the combustor exit height, H1/H3, has a value in the range from 1.2 to 1.6.

4. A method of designing an annular combustor for a gas turbine engine as recited in claim 3 further comprising the step of sizing the annular combustor such that the ratio of combustor length to the combustor exit height, L/H3, has a value less than or equal to 6.0.

5. A method of controlling NOx formation in a gas turbine engine having an annular combustor having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define a single annular combustion chamber for combusting fuel in air; the bulkhead having a height, H1, and the combustion chamber having an exit height, H3, and a length, L; the method comprising the steps of:
  sizing the annular combustor such that the ratio of the bulkhead height to the combustor exit height, H1/H3, has a value in the range from 1.2 to 1.6;
  operating the annular combustor in a rich-quench-lean combustion mode whereby a fuel rich burn zone is provided in a forward region of the combustion chamber, and a dilution zone is provided downstream of the fuel rich burn zone;
  admitting fuel to be combusted to the fuel rich burn zone only; and
  admitting air to the combustion chamber, with about 10% to about 30% of the admitted air being admitted directly into the fuel rich burn zone, with about 40% to about 80% of the admitted air being admitted directly into the dilution zone, and with about 5% to about 35% of the admitted air being admitted as air for cooling the inner and outer liners.

6. A method of controlling NOx formation in a gas turbine engine as recited in claim 5 further comprising the step of sizing the annular combustor such that the ratio of combustor length to the combustor exit height, L/H3, has a value less than or equal to 6.0.

7. A method of controlling NOx formation in a gas turbine engine as recited in claim 5 wherein admitting air to the combustion chamber comprises admitting 12% to 18% of the admitted air directly into the fuel rich burn zone, admitting 50% to 70% of the admitted air directly into the dilution zone, and admitting 12% to 18% of the admitted air as air for cooling the inner and outer liners.

8. A method of controlling NOx formation in a gas turbine engine having an annular combustor having an inner circumferentially extending liner having an axis, an outer circumferentially extending liner spaced radially outboard of and coaxially circumscribing the inner liner, and a bulkhead extending between a forward end of the inner liner and a forward end of the outer liner and cooperating therewith to define a single annular combustion chamber for combusting fuel in air; the bulkhead having a height, H1, and the combustion chamber having an exit height, H3, and a length, L; the method comprising the steps of:
  sizing the annular combustor such that the ratio of the bulkhead height to the combustor exit height, H1/H3, has a value in the range from 1.2 to 1.6;
  operating the annular combustor in a lean direct injection combustion mode whereby a fuel lean burn zone is provided in a forward region of the combustion chamber, and a mixing or dilution zone is provided downstream of the fuel lean burn zone;
  admitting fuel to be combusted to the fuel rich burn zone only; and
  admitting air to the combustion chamber, with about 50% to about 90% of the admitted air being admitted directly into the fuel lean burn zone, with about 0% to about 20% of the admitted air being admitted directly into the mixing or dilution zone, and with about 0% to about 25% of the admitted air being admitted as air for cooling the inner and outer liners.

9. A method of controlling NOx formation in a gas turbine engine as recited in claim 8 further comprising the step of sizing the annular combustor such that the ratio of combustor length to the combustor exit height, L/H3, has a value less than or equal to 6.0.

10. A method of controlling NOx formation in a gas turbine engine as recited in claim 8 wherein admitting air to the combustion chamber comprises admitting 60% to 80% of the admitted air directly into the fuel lean burn zone, admitting 0% to 10% of the admitted air directly into the dilution zone, and admitting 5% to 15% of the admitted air as air for cooling the inner and outer liners.

11. A gas turbine engine having a combustor, a compressor, and a turbine coaxially disposed about a central longitudinal axis, characterized by an annular combustor comprising:
  a first circumferentially extending liner having an axis disposed coaxially with the longitudinal axis of the engine;
  a second circumferentially extending liner spaced radially outboard of and circumscribing the first liner; and
  a bulkhead extending between a forward end of the first liner and a forward end of the second liner and cooperating therewith to define a single annular combustion chamber for combusting fuel in air, the bulkhead having a height, H1, and the combustion chamber having an exit height, H3, and a length, L;
  said annular combustor characterized in that the ratio of the bulkhead height to the combustor exit height, H1/H3, has a value in the range from 1.2 to 1.6.

12. A gas turbine engine as recited in claim 11 further characterized in that the ratio of combustor length to the combustor exit height, L/H3, has a value less than or equal to 6.0.

13. A gas turbine engine having a combustor, a compressor, and a turbine coaxially disposed about a central longitudinal axis, characterized by an annular combustor comprising:
  a first circumferentially extending liner having an axis disposed coaxially with the longitudinal axis of the engine;
  a second circumferentially extending liner spaced radially outboard of and circumscribing the first liner; and
  a bulkhead extending between a forward end of the first liner and a forward end of the second liner and cooperating therewith to define a single annular combustion chamber for combusting fuel in air, the bulkhead having a height, H1, and the combustion chamber having an exit height, H3, and a length, L;
  said annular combustor characterized in that:
  the ratio of the bulkhead height to the combustor exit height, H1/H3, has a value in the range from 1.2 to 1.6; and
  the ratio of combustor length to the combustor exit height, L/H3, has a value less than or equal to 6.0.

* * * * *